No. 618,575. Patented Jan. 31, 1899.
F. M. LYTE.
METHOD OF AND APPARATUS FOR PRODUCING CHLORIN, ZINC, OR OTHER METALS FROM MIXED ORES.
(Application filed Dec. 30, 1897.)
(No Model.)
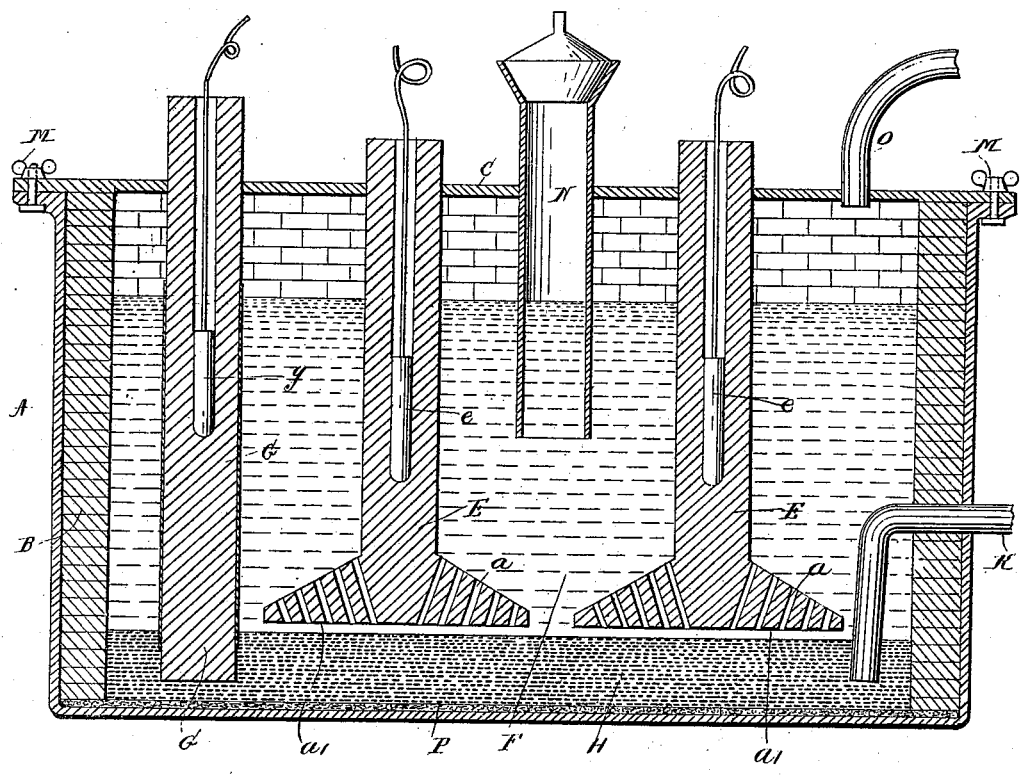
WITNESSES
INVENTOR
Farnham M. Lyte,
BY
ATTORNEYS.

UNITED STATES PATENT OFFICE.

FARNHAM MAXWELL LYTE, OF LONDON, ENGLAND.

METHOD OF AND APPARATUS FOR PRODUCING CHLORIN, ZINC, OR OTHER METALS FROM MIXED ORES.

SPECIFICATION forming part of Letters Patent No. 618,575, dated January 31, 1899.

Application filed December 30, 1897. Serial No. 664,519. (No model.)

*To all whom it may concern:*

Be it known that I, FARNHAM MAXWELL LYTE, a subject of the Queen of Great Britain, residing at Kensington, London, England, have invented certain new and useful Improvements in Methods of and Apparatus for Producing Chlorin, Zinc, or other Metals from Mixed Ores, of which the following is a full and complete specification, such as will enable those skilled in the art to which it appertains to make and use the same.

This invention consists of an improved method of and apparatus for the production of chlorin and the separation of metallic zinc, lead, and silver from mixed ores of blende and galena or to the treatment of blende alone, and is the same as that for which Letters Patent were granted in Great Britain December 22, 1896, No. 15,813, and also relates to the same subject-matter as that covered by provisional Letters Patent of Great Britain No. 11,190, dated May 5, 1897.

In the accompanying drawings I have illustrated in cross-section the preferred form of electrolytic cell which is employed in connection with my improved process or method; but it will be understood that any other convenient or adapted form or construction of cell may be used, if desired.

In the practice of my invention the mixed ore, if that is the ore to be treated, is first purified from the blende it contains by the known method at present employed for that purpose—viz., grinding, calcination at a low temperature, and extraction of the basic zinc sulfate formed by lixiviation with dilute sulfuric acid. If blende alone be treated, it may be dealt with in the same way, or zinc sulfate formed in any other way may be employed.

The crude zinc sulfate may be purified in the usual manner from the other metallic sulfates and any other impurities it contains. Magnesic sulfate, however, is difficult of separation; but the presence of magnesium in small proportions will not be injurious to the quality of the zinc. It is then neutralized, if acid, and converted into zinc chlorid by an addition to its solution, which has been concentrated, if requisite, of an equivalent amount of calcic chlorid or sodic chlorid, in the latter case the separation of the sodic sulfate formed being assisted by refrigeration to 0° centigrade, or below.

The zinc chlorid may also be produced from the crude zinc sulfate before its purification, and subsequently purified from metallic impurities, or a solution of a zinc chlorid may be produced in any other way. However it may have been formed, the zinc-chlorid solution is evaporated and deprived, as far as possible, of its water. Toward the end of the evaporation a high temperature is attained; but even at the temperature of melting zinc or beyond that zinc chlorid still retains some water and part of the zinc chlorid is decomposed with formation of zinc oxid and evolution of hydrochloric acid. Part of the zinc oxid remains in suspension in the fused chlorid as oxychlorid and part is dissolved in it. The concentration of the zinc chlorid may be performed in any suitable apparatus—such, for instance, as is employed for the concentration of sulfuric acid. The final dehydration of the zinc chlorid may very well be performed by heating it in a closed cell similar to the electrolytic cell to be described farther on. If the heating were long enough continued, its dehydration would probably become nearly, if not quite, complete. It may, however, with considerable advantage be conducted in presence of metallic zinc, preferably when the latter is fused. The addition of antimony or of some other electronegative metal to the zinc increases its activity by the formation of a galvanic couple. The zinc by its extreme affinity for oxygen will cause the decomposition and disappearance of the last traces of water with production of zinc oxid and evolution of hydrogen, whereas the water could only (if even possible) be driven off by long and continuous heating to a very high temperature. Metallic zinc begins to decompose water when heated with it to 100° centigrade; so, as may be supposed, zinc at its melting-point becomes extremely active. The action of the metallic zinc may even be further assisted, if desired, by electrolysis, the zinc in this case being made the anode and the carbon the cathode of the arrangement. In these conditions on passing the electric current the decomposition of the water is yet further promoted, the zinc tending still more to become oxidized, while hydrogen is evolved from the carbon cathode. By this means the dehydration of the zinc chlorid may be still further accelerated. In this process there can be no fear of the decomposition of the zinc in the form of a useless powder, as when such solutions of zinc salts are electrolyzed by a current of over fifty amperes per square meter of cathode. The zinc oxid, which is partly dissolved in the fused zinc chlorid, partly suspended in it, may now be electrolyzed without difficulty, a carbon anode and a fused zinc cathode being employed. When, first of all, that in solution is electrolyzed, then that held in suspension dissolves, takes its place, and disappears in its turn, with evolution of oxygen and deposition of zinc, which amalgamates with the fused zinc cathode, and so on. With all this, according to the voltage, more or less chlorin may be evolved with the oxygen. Finally, only anhydrous zinc chlorid remains to be electrolyzed for the production of chlorin and metallic zinc, no explosion or foaming being liable to occur, as would have been the case had the electrolysis been attempted in this way without previous dehydration.

The electrolytic cell which I prefer to use in connection with my improved process or method, a sectional view of which is illustrated in the accompanying drawings, is similar in some general characteristics to the cell shown in my previous Letters Patent of the United States, dated December 5, 1893, No. 510,276, but is materially different from and an improvement upon said previously-patented cell in several important particulars. The cell may be of any convenient shape or contour—such as square, round, polygonal, or oblong—and its bottom is preferably flat, or nearly so.

Referring to the drawings, A designates an exterior casing which is provided for purposes of strength and is preferably formed of iron. This casing is interiorly lined with firebricks, as at B, or any other impermeable and heat-resisting material or substance, the bricks being set or joined with a mortar composed of china-clay, powdered pumice, or siliceous sand moistened with a solution of sodic silicate. A cover, as at P, is provided for the bottom of the cell. This covering may be formed of asbestos cardboard, which may be silicated to give it greater solidity, or it may be formed of a thin plate of baked fireclay, such as is used (especially in Germany) when zinc is remelted in iron vessels, to prevent the zinc from coming in contact with the iron. The cell is fitted with a gas-tight covering C, formed of earthenware or of any other suitable material unaffected by chlorin, and this covering is retained in proper position by means of binding-screws, as at M, or other suitable securing devices, or in any adapted manner. A layer of molten zinc H rests permanently on the bottom of the cell, which layer may be an inch or so in thickness, and while it forms the cathode of the arrangement it also serves to shield the asbestos cardboard P beneath it from contact with the fused zinc chlorid, hereinafter mentioned, which would run into it. Above the molten zinc is the fused zinc chlorid F, which fuses at a lower temperature than the layer of zinc below it and which is the electrolyte to be decomposed. Through the cover C of the cell passes with an air-tight joint a stout carbon conductor G, which is thick enough to carry the current easily and which projects downwardly well into the fused zinc cathode and serves to convey the returned current up from it. This carbon conductor may be protected at the portion which passes through the electrolyte by a coating of enamel or other refractory or non-conducting material from contact with the electrolyte. It should be provided with the fusible core, as at $g$, (which in this case may be lead,) such as is mentioned below in connection with the carbon anodes. The carbon anodes E (two of which are shown in the drawings) also pass through the cover C with an air-tight joint. They are of hollow construction to contain cores of lead $e$, as described in my previous United States Patent. This fusible core insures good electrical contact and at the same time diminishes the resistance.

The carbon anodes E are formed with extended flat or mushroom-shaped lower ends $a'$, which flat ends are opposed to the level face of the molten zinc cathodes and occupy a relative position a short distance above the latter, which construction and relative arrangement offer the least possible resistance to the passage of the electric current. The flat ends $a'$ of the carbon anodes are pierced with numerous small perforations or passages $a$ to permit the passage of the chlorin, which is chiefly generated at their under surfaces. A pipe N of suitable construction also passes through the cover C with an airtight joint, through which pipe fresh zinc chlorid may be added as required.

In the operation of the cell the metallic zinc as it is deposited mixes with the molten cathode, and as it accumulates it runs off by the pipe K. The lower end of this pipe dips well below the surface of the molten zinc, while the upper end passes through the wall of the cell at a relative point or plane about one-third of the distance between the surface of the zinc and the surface of the molten zinc chlorid. By maintaining the level of the molten zinc chlorid always at approximately the same point the exact level at which the zinc runs off will adjust itself automatically or spontaneously in the course of working. The chlorin passes off through a pipe, as at O, extending through and from the cover C. It will be understood that these cells may be either mounted in parallel position, or several of them may be joined together in series. The process thus becomes perfectly and steadily continuous.

Having fully described my invention, I claim as new and desire to secure by Letters Patent—

1. The herein-described conjoint process for the treatment of complex sulfid ores of zinc usually carrying lead and silver, such treatment consisting in grinding, and calcining the ore at a low red heat to convert the zinc sulfid into zinc sulfate, in extracting the zinc sulfate formed by lixiviation, in converting the zinc sulfate into zinc chlorid by treating it with an alkaline chlorid and refrigerating, in concentrating the zinc chlorid formed and rendering it anhydrous by heating it in the presence of metallic zinc with production of zinc oxid and evolution of hydrogen, and in subsequently decomposing first the zinc oxid and then the zinc chlorid by means of electrolysis with an anode of carbon and a cathode of fused metallic zinc for the production of chlorin and metallic zinc and in the case of complex sulfid ores recovering the lead and silver by smelting, substantially as described.

2. The herein-described conjoint process for the treatment of complex sulfid ores of zinc usually carrying lead and silver, such treatment consisting in grinding and calcining the ore at a low red heat to convert the zinc sulfid into zinc sulfate, in extracting the zinc sulfate formed by lixiviation, in converting the zinc sulfate into zinc chlorid by treating it with an alkaline chlorid and refrigerating, in concentrating the zinc chlorid formed and rendering it anhydrous by heating it in the presence of metallic zinc, assisting the action of the zinc by electrolysis, in order to decompose the water of hydration, and in subsequently decomposing first the zinc oxid and then the zinc chlorid by means of electrolysis with an anode of carbon and a cathode of fused metallic zinc for the production of chlorin and metallic zinc and in the case of complex sulfid ores recovering the lead and silver by smelting, substantially as described.

3. In the production of chlorin and zinc from zinc chlorid, dehydrating the said zinc chlorid by heating it in the presence of metallic zinc to form zinc oxid, and simultaneously subjecting the material to electrolysis, whereby foaming and loss of power which would result from the recombination of the hydrogen with the oxygen or the chlorin are avoided, substantially as described.

4. In an electrolytic cell for the purpose described, a cathode, and an anode having an enlarged lower end portion and provided with a plurality of openings or passages through the lower end portion only thereof, and situated over said cathode and means for heating said cell, substantially as described.

5. In an electrolytic cell for the purpose described, a cathode, and an anode having an enlarged or flanged lower end, upright openings or passages through the enlarged or flanged portion of said anode and means for heating said cell, substantially as described.

6. An electrolytic cell for the purpose described, having its interior surface formed by side walls of refractory material, and a bottom of asbestos board and provided with an anode, a cathode, and means for heating said cell, substantially as described.

7. In an electrolytic cell for the purpose described, an asbestos bottom upon which rests a layer of zinc forming a cathode, an anode, and means for heating said cell, substantially as described.

In testimony that I claim the foregoing as my invention I have signed my name, in presence of the subscribing witnesses, this 9th day of December, 1897.

FARNHAM MAXWELL LYTE.

Witnesses:
PERCY E. MATTOCKS,
EDMUND STANHOPE SNEWIN.